United States Patent
Jung et al.

(10) Patent No.: US 9,656,625 B2
(45) Date of Patent: May 23, 2017

(54) KNEE AIRBAG APPARATUS AND METHOD OF FOLDING AIRBAG OF THE SAME

(71) Applicant: AUTOLIV DEVELOPMENT AB, Vårgårda (SE)

(72) Inventors: Doo Seob Jung, Hwaseong-si (KR); Do-Gwan Kim, Osan-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/784,313

(22) PCT Filed: Mar. 31, 2014

(86) PCT No.: PCT/KR2014/002702
§ 371 (c)(1),
(2) Date: Oct. 14, 2015

(87) PCT Pub. No.: WO2014/171645
PCT Pub. Date: Oct. 23, 2014

(65) Prior Publication Data
US 2016/0052480 A1 Feb. 25, 2016

(30) Foreign Application Priority Data
Apr. 19, 2013 (KR) .................. 10-2013-0043479

(51) Int. Cl.
*B60R 21/237* (2006.01)
*B60R 21/206* (2011.01)
*B60R 21/231* (2011.01)

(52) U.S. Cl.
CPC .......... *B60R 21/237* (2013.01); *B60R 21/206* (2013.01); *B60R 21/231* (2013.01); *B60R 2021/23169* (2013.01)

(58) Field of Classification Search
CPC ... B60R 21/206; B60R 21/231; B60R 21/237; B60R 2021/23169
See application file for complete search history.

(56) References Cited

U.S. PATENT DOCUMENTS

| | | | |
|---|---|---|---|
| 5,324,070 A | * | 6/1994 | Kitagawa .............. B60R 21/206 280/730.1 |
| 7,175,195 B2 | | 2/2007 | Morita |

(Continued)

FOREIGN PATENT DOCUMENTS

| JP | 2004-203233 A | 7/2004 |
|---|---|---|
| KR | 10-2010-0136236 A | 12/2010 |

OTHER PUBLICATIONS

International Search Report and Written Opinion of the ISA for PCT/KR2014/002702, ISA/KR, Daejeon, mailed Aug. 13, 2014.

*Primary Examiner* — Barry Gooden, Jr.
(74) *Attorney, Agent, or Firm* — Stephen T. Olson; Harness, Dickey & Pierce, P.L.C.

(57) ABSTRACT

A knee airbag apparatus includes a folded airbag. The folded airbag includes an upper folded part formed by rolling an upper end of the airbag toward a lower end of the airbag after the upper end of the airbag is folded on the front panel; and a lower folded part disposed to be adjacent to the upper folded part by folding at least once a lower portion of the airbag in a direction that is opposite to the rolling direction of the upper folded part. The folded airbag includes a side folded part formed by folding a side portion of the airbag before the upper folded part is formed or by folding both sides of the upper and lower folded parts after the upper and lower folded parts are formed.

20 Claims, 10 Drawing Sheets

(56) References Cited

U.S. PATENT DOCUMENTS

| | | | |
|---|---|---|---|
| 7,819,420 B2 * | 10/2010 | Adachi | B60R 21/203 280/730.1 |
| 8,500,157 B2 | 8/2013 | Schneider et al. | |
| 8,696,019 B2 | 4/2014 | Chavez et al. | |
| 2002/0171230 A1 * | 11/2002 | Takimoto | B60R 21/206 280/730.1 |
| 2002/0171231 A1 * | 11/2002 | Takimoto | B60R 21/206 280/730.1 |
| 2004/0124617 A1 | 7/2004 | Morita | |
| 2006/0279073 A1 * | 12/2006 | Hotta | B60R 21/206 280/730.1 |
| 2007/0132215 A1 * | 6/2007 | Takimoto | B60R 21/206 280/730.1 |
| 2007/0182134 A1 * | 8/2007 | Mizuno | B60R 21/206 280/730.1 |
| 2008/0217888 A1 * | 9/2008 | Fukawatase | B60R 21/2032 280/730.1 |
| 2009/0058048 A1 * | 3/2009 | Ishida | B60R 21/20 280/728.2 |
| 2010/0007120 A1 | 1/2010 | Adachi et al. | |
| 2010/0295279 A1 * | 11/2010 | Fukawatase | B60R 21/203 280/730.1 |
| 2011/0095512 A1 * | 4/2011 | Mendez | B60R 21/206 280/730.1 |
| 2012/0025496 A1 | 2/2012 | Schneider et al. | |
| 2012/0242066 A1 | 9/2012 | Chavez et al. | |
| 2013/0113190 A1 * | 5/2013 | Schneider | B60R 21/206 280/728.2 |
| 2014/0265281 A1 * | 9/2014 | Witt, Jr. | B60R 21/2338 280/743.2 |
| 2015/0197211 A1 * | 7/2015 | Tanaka | B60R 21/206 280/729 |
| 2016/0046253 A1 * | 2/2016 | Jung | B60R 21/206 280/729 |
| 2016/0059815 A1 * | 3/2016 | Jung | B60R 21/206 280/730.1 |

* cited by examiner

KNEE AIRBAG APPARATUS AND METHOD OF FOLDING AIRBAG OF THE SAME

CROSS-REFERENCE TO RELATED APPLICATIONS

This application is a 371 U.S. National Stage of International Application No. PCT/KR2014/002702, filed Mar. 31, 2014. This application claims the benefit of and priority to Korean Patent Application No. 10-2013-0043479, filed Apr. 19, 2013. The entire disclosures of the above applications are incorporated herein by reference.

TECHNICAL FIELD

The present invention relates to a knee airbag apparatus and a method of folding an airbag of the same. More particularly, the present invention relates to a knee airbag apparatus which is capable of preventing an airbag from interfering with a connecting part to which an instrument panel and housing are coupled when the airbag is inflated and a method of folding an airbag of the same.

BACKGROUND ART

A knee airbag apparatus protects legs of a passenger upon a collision by deploying an airbag between an instrument panel and the lower legs, for example, tibias of the passenger.

The airbag prevents a passenger from colliding with the instrument panel at a high acceleration upon a vehicle collision. The instrument pane is made of a high stiffness material so a high force is applied to the legs of the passenger when the passenger collides with the instrument panel at a high acceleration.

The airbag allows the passenger to collide with the airbag instead of the components of a vehicle, so that relatively low impact is applied to the passenger.

The knee airbag apparatus, which is located behind the instrument panel, is configured to be deployed through a door or chute placed on a surface of the instrument panel.

To the contrary, the knee airbag apparatus, which is installed at a lower portion of the instrument panel, is deployed toward the bottom of the vehicle at the first stage, and then, is deployed upward along the instrument panel of the vehicle (this knee airbag apparatus is called a low mounting knee airbag apparatus).

(Patent document 1) U.S. Patent publication No. 2012/0025498 A1

(Patent document 2) U.S. Patent publication No. 2005/0230941 A1

DISCLOSURE OF INVENTION

Technical Problem

In the knee airbag apparatus described above, the airbag is received in a housing in a folded state, and if gas is supplied from an inflator to the airbag, the airbag is inflated to be output to an outside of the housing, such that the airbag is deployed upward between an instrument panel and knees of a passenger.

Interference is caused by a surrounding structure such as a coupled portion between the housing and the instrument panel while the airbag is inflated from the folded state, so that the deployment of the airbag may not be easily performed.

Accordingly, it is an object of the present invention to provide a knee airbag apparatus in which an airbag is rapidly deployed without interfering with a housing and an instrument panel while the airbag is initially deployed by improving a folded structure of the airbag, and a method of folding an airbag of the same.

It is another object of the present invention to provide a knee airbag apparatus capable of preventing an airbag from being caught between knees of a passenger when the airbag is deployed by improving a folded structure of the airbag, and a method of folding an airbag of the same.

Solution to Problem

According to one aspect of the present invention, there is provided a knee airbag apparatus includes a housing installed in an instrument panel of a vehicle; an airbag received in the housing in a form of a folded airbag and deployed from the housing forward of knees of a passenger, the airbag including a front panel adjacent to the instrument panel and a rear panel adjacent to the knees of the passenger; and an inflator installed in the housing to supply gas to the airbag, wherein the folded airbag includes an upper folded part formed by rolling an upper end of the airbag toward a lower end of the airbag after folding the upper end of the airbag on the front panel; and a lower folded part disposed adjacent to the upper folded part by folding at least once a lower portion of the airbag in a direction opposite to the rolling direction of the upper folded part, the inflator is disposed forward of the housing, the upper folded part is disposed rearward of the housing, and the lower folded part is disposed on the upper folded part in parallel with a bottom of the housing.

The rear panel includes a wrinkle portion constituting an additional inflation chamber when the airbag is inflated, and the lower folded part is disposed corresponding to the wrinkle portion.

The folded airbag includes a side folded part formed by folding at least once both sides of the airbag before the upper folded part is formed.

The folded airbag includes a side folded part formed by folding both sides of the upper and lower folded parts toward the rear panel of the airbag.

The airbag is configured to be deployed upward between the instrument panel and the knees of the passenger after the airbag is initially deployed toward a bottom of the vehicle.

According to another aspect of the present invention, there is provided a method of folding an airbag of a knee airbag apparatus deployed from a housing forward of knees of a passenger and including a front panel adjacent to an instrument panel and a rear panel adjacent to the knees of the passenger. The method includes forming an upper folded part by rolling an upper portion of the airbag toward a lower end of the airbag; forming a lower folded part by folding at least once a lower portion of the airbag in a direction opposite to a rolling direction of the upper folded part; and disposing the lower folded part on the upper folded part.

The upper folded part is rolled on the front panel.

The method further includes forming a side folded part by vertically folding at least once both sides of the airbag before the forming of the upper folded part.

The side folded part is folded in a zigzag form.

The lower folded part includes a portion in which a wrinkle portion of the rear panel is formed.

The method further includes forming a side folded part by folding both sides of the upper folded part and the lower folded part toward the rear panel.

Advantageous Effects of Invention

According to a knee airbag apparatus and a method of folding an airbag of the same of the present invention, the configuration of the folded airbag is improved, such that the lower portion of the front panel of the airbag can be induced to first make contact with the connecting part of the housing and the instrument panel when the airbag is initially deployed.

According to a knee airbag apparatus and a method of folding an airbag of the same of the present invention, while the airbag is being deployed, the airbag can be prevented from being caught between knees of a passenger.

BRIEF DESCRIPTION OF DRAWINGS

FIG. 4b is a perspective view showing a folded state of both sides of a folded airbag in FIG. 4a;

FIG. 6b is a sectional view taken along line 6b-6b of FIG. 6a;

FIG. 7b is a sectional view taken along line 7b-7b of FIG. 7a;

FIG. 8b is a sectional view taken along line 8b-8b of FIG. 8a;

FIG. 9b is a sectional view taken along line 9b-9b of FIG. 9a;

FIG. 10b is a sectional view taken along line 10b-10b of FIG. 10a;

FIG. 11b is a sectional view taken along line 11b-11b of FIG. 11a;

FIG. 12b is a sectional view taken along line 12b-12b of FIG. 12a.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the following description, directional terms described below, such as "upper direction", "lower direction", "forward direction", and "rearward direction", will be defined based on an airbag housing in a state that the airbag housing is coupled to a lower portion of an instrument panel. That is, a direction toward the roof of a vehicle is defined as an upper direction (U), a direction toward the bottom of a vehicle is defined as a lower direction (L), a direction toward a passenger is defined as a rearward direction (R), and a direction toward a front of a vehicle is defined as a forward direction (F).

In addition, the directional terms, such as "upper end", "lower end", "vertical direction", "horizontal direction", "upper portion", "lower portion" and the like will be defined as follows. In detail, in a state that the non-inflated airbag is unfolded on a plane, a portion adjacent to a portion connected to an inflator is defined as a lower portion, an end of the lower portion is defined as a lower end, a portion facing the lower portion is defined as an upper portion, an end of the upper portion is defined as an upper end, a direction parallel with the upper end of the airbag is defined as a horizontal direction, and a direction perpendicular to the horizontal direction is defined as a vertical direction.

Figure 1:
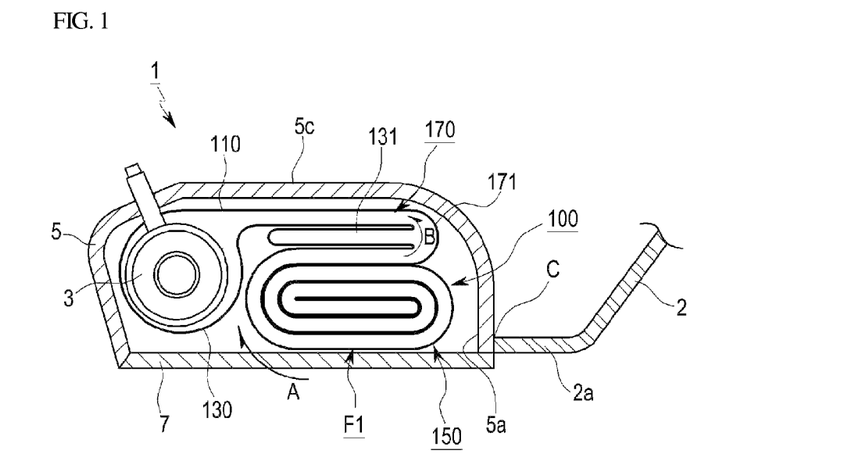
FIG. 1 is a longitudinal sectional view showing a folded state of an airbag of a knee airbag apparatus according to an embodiment of the present invention.
Figure 2:
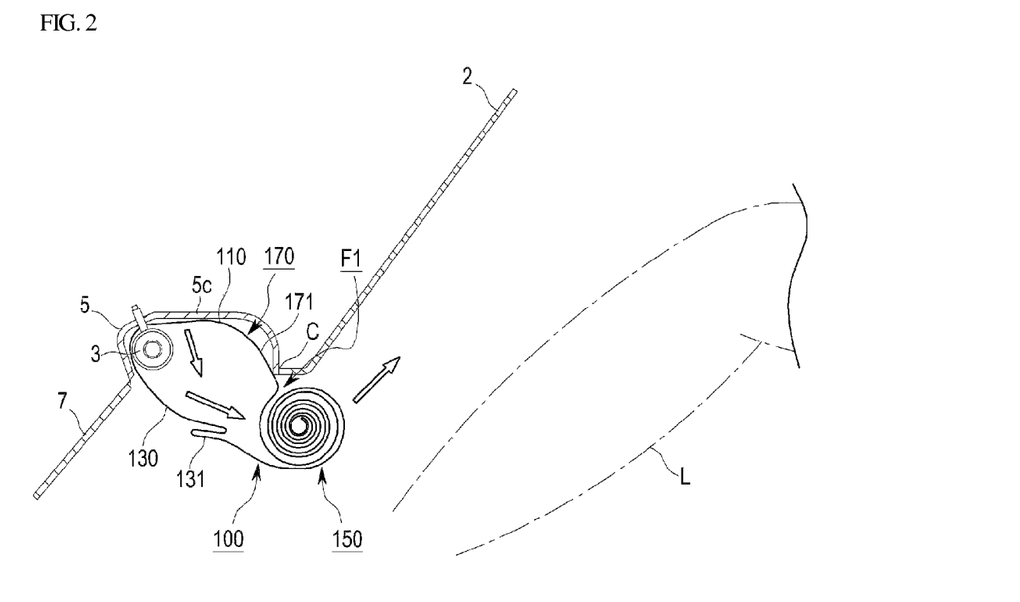
FIG. 2 is a longitudinal sectional view showing an initially inflated state of an airbag of a knee airbag apparatus according to an embodiment of the present invention.

FIG. 1 is a longitudinal sectional view showing a folded state of an airbag of a knee airbag apparatus according to an embodiment of the present invention. FIG. 2 is a longitudinal sectional view showing an initially deployed state of an airbag of a knee airbag apparatus according to an embodiment of the present invention.

Referring to FIGS. 1 and 2, the knee airbag apparatus 1 is installed at a lower portion of an instrument panel 2.

The knee airbag apparatus 1 includes an airbag 100, an inflator 3 for supplying gas to the airbag 100 upon collision of a vehicle, an airbag housing 5 for receiving the airbag 100 and the inflator 3, and a door 7 for covering an opening 5a in the airbag housing 5.

The airbag 100 includes a front panel 110 which neighbors on the instrument panel 2 and includes an installation hole 113, and a rear panel 130 which neighbors on lower legs L of a passenger when the airbag 100 is inflated.

A rear panel 130 includes a wrinkle portion 131 which is smoothed out when inflating the airbag, such that the airbag 100 is deployed upward along the instrument panel 2.

The airbag 100 is formed into a folded airbag F1 which is capable of being received in a housing 5.

The folded airbag F1 includes an upper folded part 150 which is formed by rolling an upper portion of the airbag 100 toward a lower end of the airbag 100, and a lower folded part 170 which is formed by folding a middle of a lower portion of the airbag 100 at least once and is adjacent to the upper folded part 150.

The lower folded part 170 is folded about a folding line 171 in a direction (Arrow B) opposite to a rolled direction of the upper folded part 150. The lower folded part 170 is disposed on the upper folded part 150 and in parallel with the bottom 5c of the housing 5.

When the airbag is inflated, the lower folded part 170 is primarily inflated while making contact with the connecting part C where the housing 5 is connected to the instrument panel 2, so that the upper folded part 150, which is successively inflated, is smoothly inflated without interfering with the connecting part C.

Figure 3:
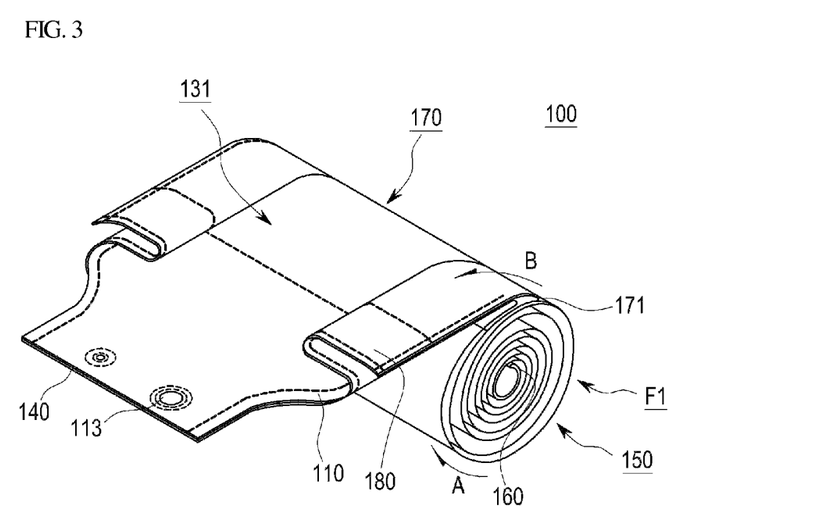
FIG. 3 is a perspective view showing a folded airbag of a knee airbag apparatus according to an embodiment of the present invention.

FIG. 3 is a perspective view showing a configuration of a folded airbag according to one embodiment of the present invention.

Referring to FIG. 3, the airbag F1 of the airbag includes a side folded part 180 which is formed by once folding the unfolded airbag 100 from both sides of the unfolded airbag 100 toward the center of the airbag.

The side folded part 180 induces the airbag to be deployed laterally from the initial deployment of the airbag, so that the airbag 100 is prevented from being caught between knees of a passenger.

The folded airbag F1 includes the upper folded part 150 which is formed by continuously rolling an upper portion of the airbag 100 in the direction of arrow A toward the lower end of the airbag 100 and the lower folded part 170 which is formed by folding the upper portion about the folding line 171 adjacent to the upper folded part 150 in the direction of arrow B in the state of forming the side folded part 180.

The lower folded part 170 includes the wrinkle portion 131 formed at the rear panel 130.

Reference numeral 113 denotes an inflator installation hole into which an insulator is inserted.

Figure 4A:
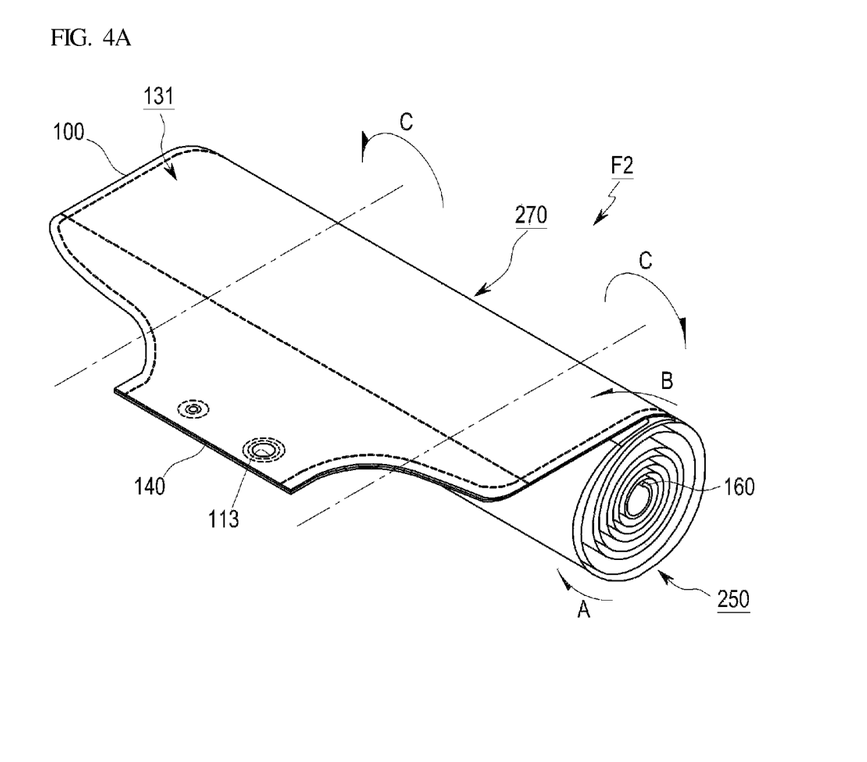
FIG. 4a is a perspective view showing a folded state of a portion of an airbag of a knee airbag apparatus according to another embodiment of the present invention.
Figure 4B:
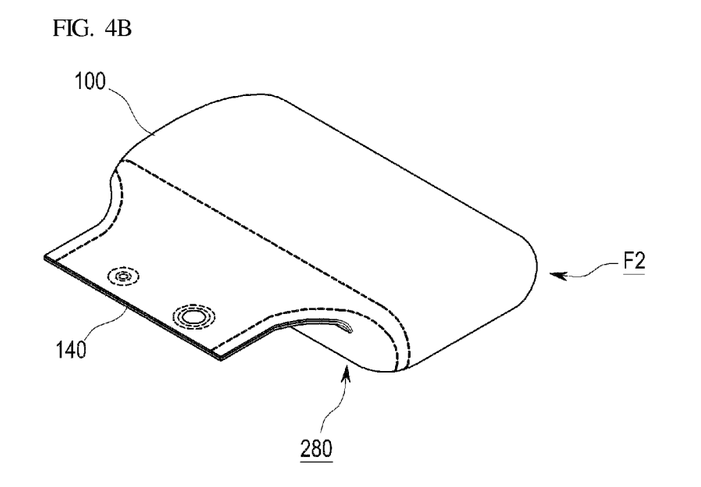

FIG. 4a is a perspective view showing a folded state of a portion of an airbag of a knee airbag apparatus according to another embodiment of the present invention, and FIG. 4b is a perspective view showing a folded state of both sides of a folded airbag in FIG. 4a.

Referring to FIG. 4a, the folded airbag F2 includes an upper folded part 250 which is formed by rolling an upper portion of the airbag 100 in the direction of arrow A toward the lower end of the airbag 100, and a lower folded part 270 which is disposed to be adjacent to the upper folded part 250 by folding at least once the middle of a lower portion of the airbag 100, and a side folded part 280 which is formed by folding both ends of the upper folded part 250 and the lower folded part 270 in the direction of arrow C.

In the folded airbag F1 described above, after the side folded part 180 is primarily formed, the upper folded part 150 is formed. To the contrary, in the airbag folded part F2, after the upper and lower folded parts 250 and 270 are formed, the side folded part 280 is formed.

Figure 5:
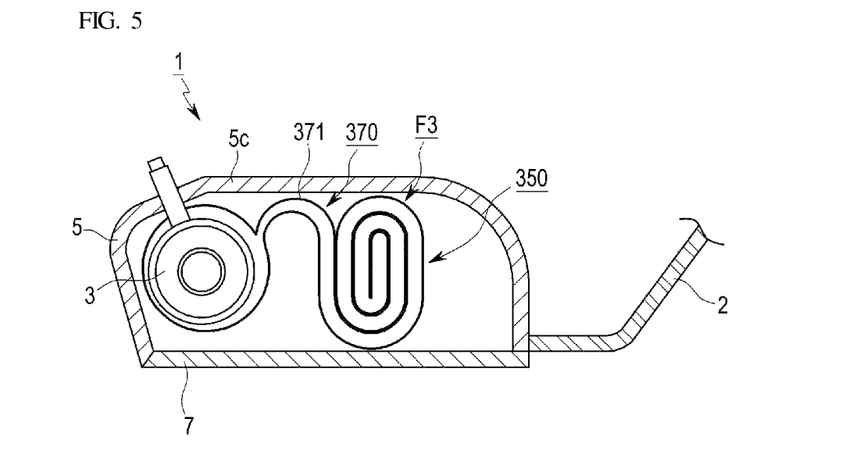
FIG. 5 is a longitudinal sectional view showing a folded state of an airbag of a knee airbag apparatus according to still another embodiment of the present invention.

FIG. 5 is a longitudinal sectional view showing a folded state of an airbag of a knee airbag apparatus according to still another embodiment of the present invention.

Referring to FIG. 5, in an airbag assembly F3, a lower folded part 370 may be disposed substantially in perpendicular to a bottom 5c of a housing 5 between an inflator 3 and an upper folded part 350.

In this case, since a depth of the housing 5 is shorter than a width of the housing 5, a folding line 371 of the lower folded part 370 may be relatively increased.

As described above, the knee airbag apparatus may be a low mounting knee airbag apparatus which is installed at a low portion of the instrument panel 2 of driver and passenger seats and in which the airbag 100 is deployed toward the bottom B of the vehicle at the initial stage and then, is deployed upward along the instrument panel of the vehicle.

In addition, the knee airbag apparatus 1 may be installed at various positions such as a lower portion of a steering wheel of a driver seat.

Next, a method of folding an airbag according to an embodiment of the present invention will be described in more detail.

FIGS. 6a to 9b are views illustrating a process of forming a folded airbag F1 according to an embodiment of the present invention.

Figure 6A:
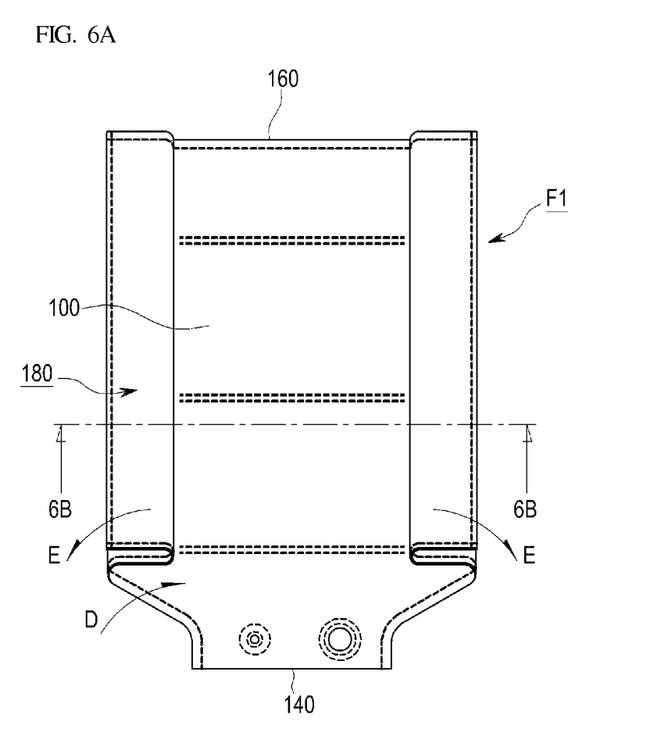
FIG. 6a is a plan view illustrating a process of forming a side folded part of a folded airbag according to an embodiment of the present invention.
Figure 6B:
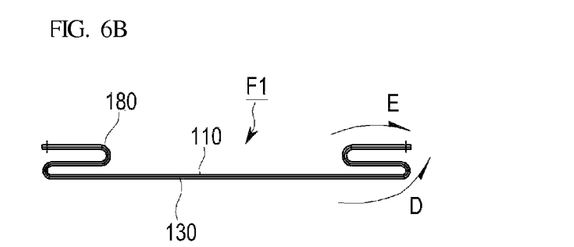

Referring to FIGS. 6a and 6b, the side folded part 180 is formed by folding at least once both sides of the airbag 100 toward the center of the airbag 100.

After the side folded part 180 is folded toward the center of the airbag 100 in the direction of arrow D, the side folder part 180 is folded toward an outside of the airbag 100 in the direction of arrow E.

Figure 7A:
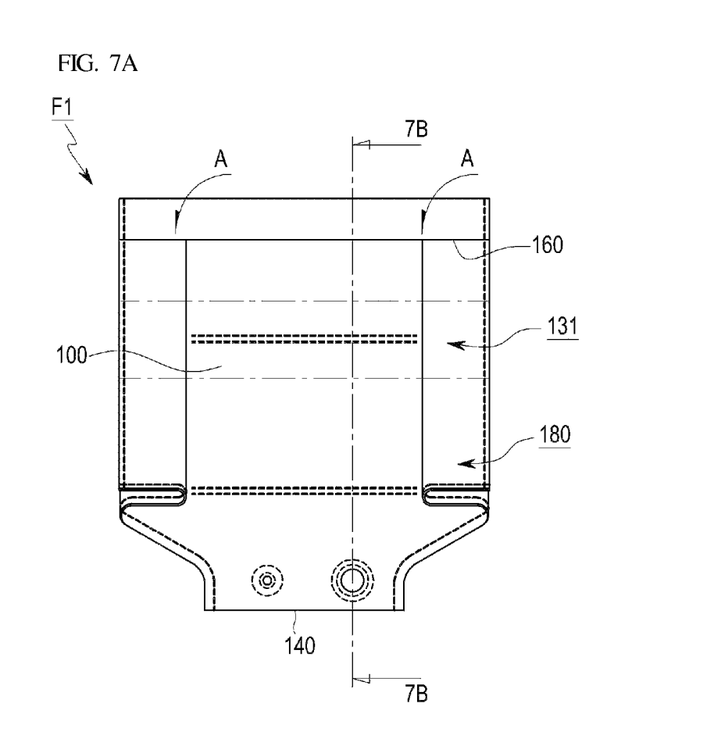
FIG. 7a is a plan view illustrating a process of forming a upper folded part of a folded airbag according to an embodiment of the present invention.
Figure 7B:
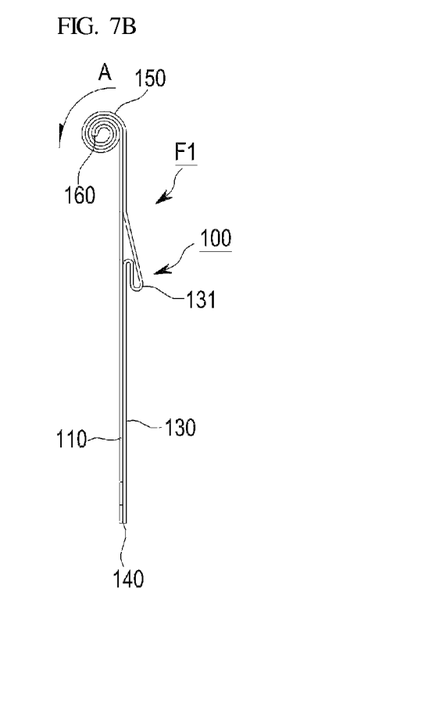

Referring to FIGS. 7a and 7b, after the upper end of the airbag in which the side folded part 180 is folded on the front panel 110 of the airbag 100, the upper end 160.

Figure 8A:
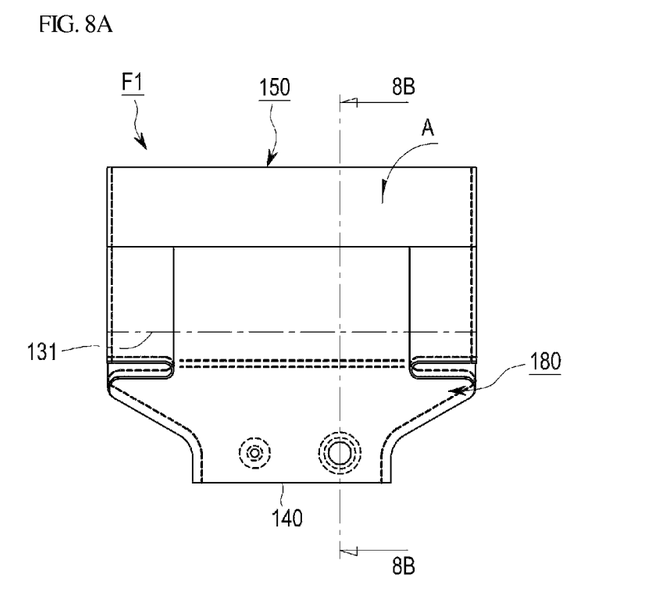
FIG. 8a is a plan view showing a continuously rolled state of an upper folded part of a folded airbag according to an embodiment of the present invention.
Figure 8B:
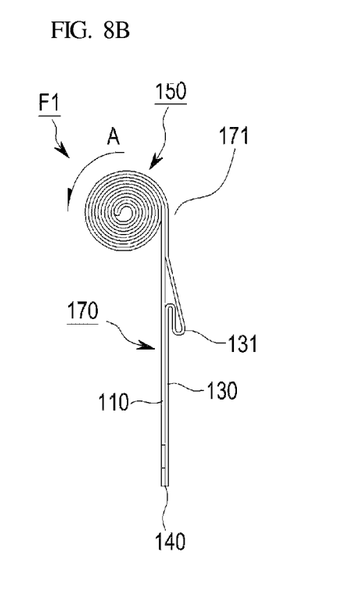

Referring to FIGS. 8a and 8b, the upper folded part 150 is continuously rolled to a portion to which the wrinkle portion 131 of the rear panel 130 is formed.

Figure 9A:
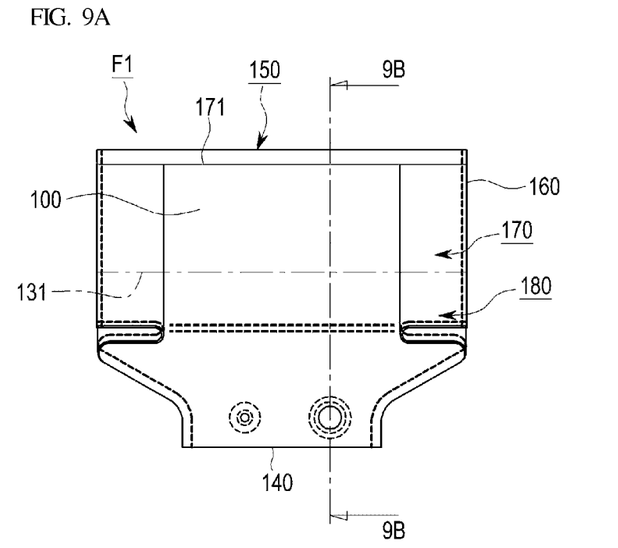
FIG. 9a is a plane view showing a formed state of a lower folded part of an airbag according to an embodiment of the present invention.
Figure 9B:
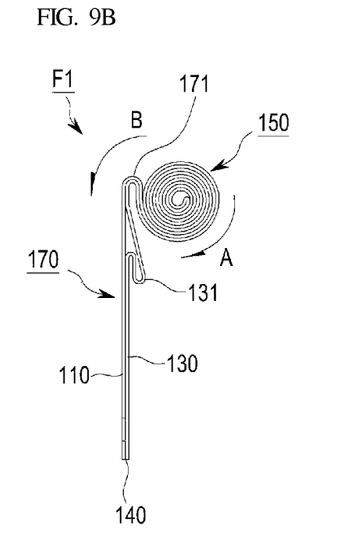

Referring to FIGS. 9a and 9b, the lower portion of the airbag 100 is folded about the folding line 171 in the direction of arrow B which is opposite to the rolling direction A of the upper folded part 150 so that the folded airbag F1 is completed.

Even if the legs of the passenger are very approached to the instrument panel, the folded airbag F1 may allow the airbag to be deployed easily and rapidly without being caught between the two legs of the passenger.

Next, a method of folding a folded airbag F2 of a knee airbag apparatus according to another embodiment of the present invention will be described in more detail.

Figure 10A:
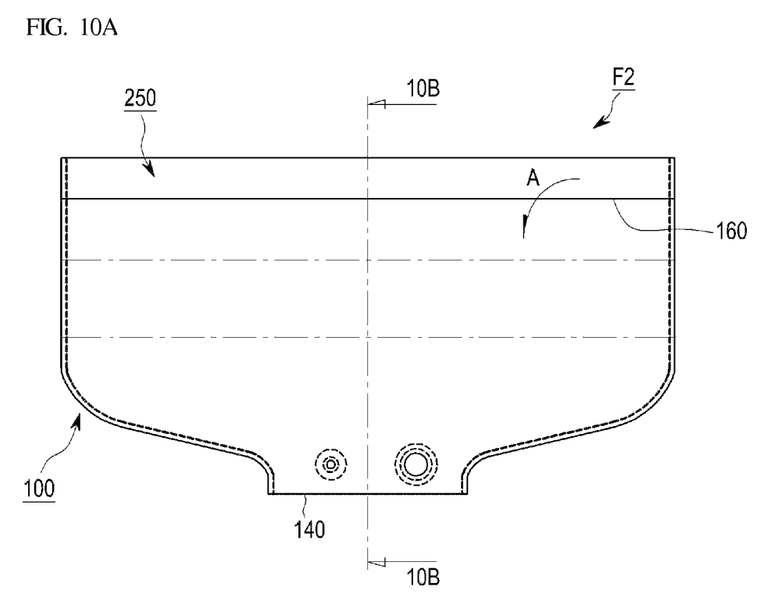
FIG. 10a is a plan view illustrating a process of forming an upper folded part of a folded airbag according to another embodiment of the present invention.
Figure 10B:
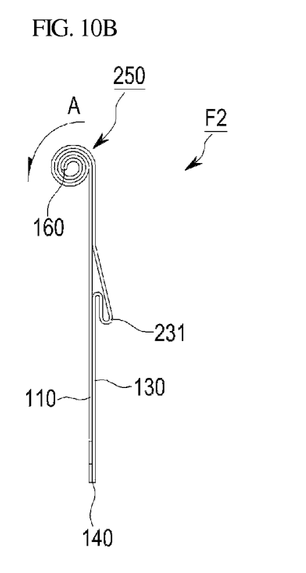

The upper folded part 250 is formed by rolling the lower end of the airbag 100 about the upper end 160 of the airbag 100 in the direction of arrow A.

Figure 11A:
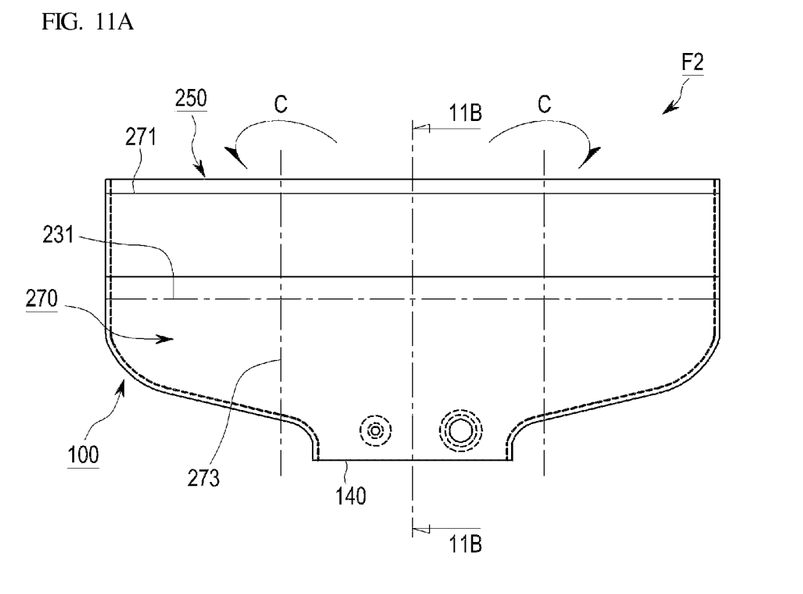
FIG. 11a is a plan view illustrating a process of forming a lower folded part of a folded airbag according to another embodiment of the present invention.
Figure 11B:
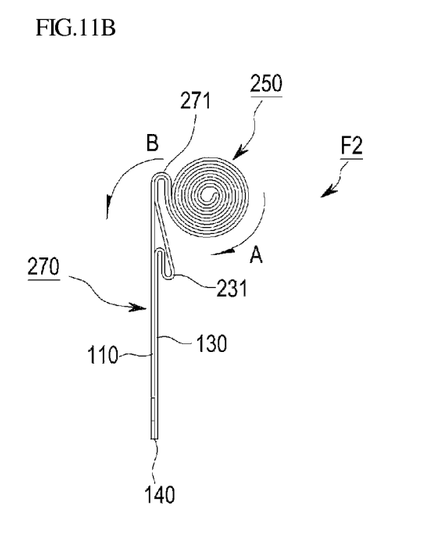

Referring to FIGS. 11a and 11b, the lower portion of the airbag 100 is folded about the folding line 271 positioned substantially at a middle of the lower portion of the airbag 100 in the direction of arrow B which is opposite to the rolling direction of arrow A of the upper folded part 250 so that the lower folded part 270 is formed.

Figure 12A:
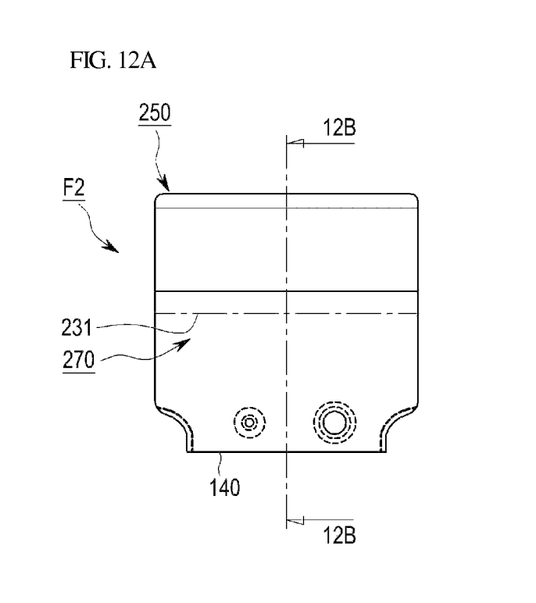
FIG. 12a is a plan view illustrating a process of forming a side folded part of a folded airbag according to still another embodiment of the present invention.
Figure 12B:
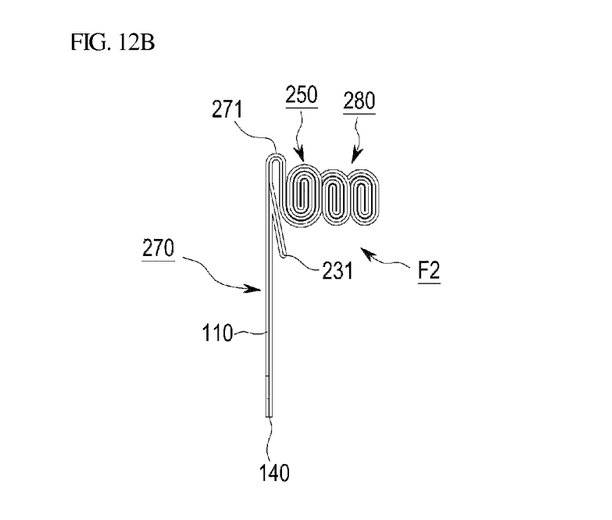

Referring to FIGS. 12a and 12b, the side folded part 280 is formed by folding the airbag 100 about the folding line 273 of FIG. 11a toward the back of the airbag 100 in the direction of arrow C, so that the folded airbag F2 is completed.

The folded airbag F2 configured above may be deployed easily and rapidly in a small space between the knees of the passenger and the instrument panel.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:
1. A knee airbag apparatus comprising:
a housing for installation in an instrument panel of a vehicle,
an airbag received in the housing in a form of a folded airbag and deployable from the housing forward of knees of a passenger, the airbag including a front panel for deployment adjacent to the instrument panel and a rear panel for deployment adjacent to the knees of the passenger; and an inflator installed in the housing to supply gas to the airbag, wherein the folded airbag includes:

an upper folded part rolled from an upper end of the airbag in a rolling direction toward a lower end of the airbag after folding the upper end of the airbag on the front panel; and a lower folded part disposed adjacent to the upper folded part by folding at least once a lower portion of the airbag in a direction opposite to the rolling direction of the upper folded part, the inflator is disposed forward in the housing, the inflator in direct communication with the lower folded part, the lower folded part is disposed above the upper folded part, wherein an upward downward length of the rear panel is greater than an upward downward length of the front panel such that the rear panel includes a wrinkle portion formed by folding of a lower portion of the rear panel, the wrinkle portion deployed about a connecting part where the housing is connected to the instrument panel so as to form an additional inflatable portion, and the wrinkle portion is disposed between the upper folded part and the lower folded part.

2. The knee airbag apparatus of claim 1, wherein the folded airbag includes a side folded part formed by folding at least once both sides of the airbag before the upper folded part is formed.

3. The knee airbag apparatus of claim 1, wherein the folded airbag includes a side folded part formed by folding both sides of the upper and lower folded parts toward the rear panel of the airbag.

4. The knee airbag apparatus of claim 1, wherein the airbag is configured to be deployed upward between the instrument panel and the knees of the passenger after the airbag is initially deployed toward a bottom of the vehicle.

5. The knee airbag apparatus of claim 1, wherein the lower folded part of the folded airbag is disposed rearward of the inflator within the housing.

6. The knee airbag apparatus of claim 1, wherein the lower folded part is positioned parallel with an upper side of the housing.

7. The knee airbag apparatus of claim 1, wherein the housing includes an open lower side and an opposite upper, closed side, the lower folded part disposed between the upper folded part and the closed upper side of the housing.

8. A method of folding an airbag of a knee airbag apparatus deployed from a housing forward of knees of a passenger and including a front panel adjacent to an instrument panel and a rear panel adjacent to the knees of the passenger, the method comprising:

forming an upper folded part by rolling an upper portion of the airbag toward a lower end of the airbag in a rolling direction;

forming a lower folded part by folding at least once a lower portion of the airbag in a direction opposite to the rolling direction of the upper folded part; and disposing the lower folded part above the upper folded part such that the lower folded part is disposed between the upper folded part and a closed upper side of the housing, wherein an inflator is in direct communication with the lower folded part of the airbag, and the lower folded part and the upper folded part are disposed rearward of the inflator in the housing.

9. The method of claim 8, further comprising forming a side folded part by folding both sides of the upper folded part and the lower folded part toward the rear panel.

10. The method of claim 8, wherein the lower folded part is disposed completely between the upper folded part and the upper side of the housing.

11. The method of claim 8, wherein the lower folded part is positioned parallel with the closed upper side of the housing.

12. The method of claim 8, wherein an upward downward length of the rear panel is greater than an upward downward length of the front panel such that the rear panel includes a wrinkle portion formed by folding of a lower portion of the rear panel, the wrinkle portion deployed about a connecting part where the housing is connected to the instrument panel so as to form an additional inflatable portion, and the wrinkle portion is disposed between the upper folded part and the lower folded part.

13. The method of claim 8, wherein the upper folded part is rolled on the front panel.

14. The method of claim 13, further comprising forming a side folded part by vertically folding at least once both sides of the airbag before the forming of the upper folded part.

15. The method of claim 14, wherein the side folded part is folded in a zigzag form.

16. A knee airbag apparatus comprising:

a housing for installation in an instrument panel of a vehicle;

an airbag received in the housing in a form of a folded airbag and deployable from the housing forward of knees of a passenger, the airbag including a front panel for deployment adjacent to the instrument panel and a rear panel for deployment adjacent to the knees of the passenger; and an inflator installed in the housing to supply gas to the airbag, the folded airbag including:

a first part rolled from an upper end of the airbag in a rolling direction toward a lower end of the airbag after folding the upper end of the airbag on the front panel; and a second part disposed adjacent to the first part by folding at least once a lower portion of the airbag in a direction opposite to the rolling direction of the first part, the inflator disposed forward in the housing, the inflator in direct communication with the second part, the first part is disposed rearward of the inflator in the housing, and the inflator is in indirect communication with the first part of the folded airbag, wherein the first part is disposed between the second part and a closed upper side of the housing.

17. The knee airbag apparatus of claim 16, wherein the first and second parts of the folded airbag are completely disposed rearward of the inflator in the housing.

18. The knee airbag apparatus of claim 16, wherein the second part of the folded airbag is parallel to an adjacent portion of the housing.

19. The knee airbag apparatus of claim 16, wherein the second part is disposed above the first part within the housing.

20. The knee airbag apparatus of claim 16, wherein an upward downward length of the rear panel is greater than an upward downward length of the front panel such that the rear panel includes a wrinkle portion formed by folding of a lower portion of the rear panel, the wrinkle portion deployed about a connecting part where the housing is connected to the instrument panel so as to form an additional inflatable portion, and the wrinkle portion is disposed between the first part and the second part.

* * * * *